United States Patent [19]

Mee

[11] 4,026,884

[45] May 31, 1977

[54] METHYNE DYES AND PHOTOGRAPHIC ELEMENTS

[75] Inventor: John David Mee, Rochester, N.Y.

[73] Assignee: Eastman Kodak Company, Rochester, N.Y.

[22] Filed: Apr. 14, 1975

[21] Appl. No.: 567,916

Related U.S. Application Data

[63] Continuation-in-part of Ser. No. 375,974, July 2, 1973, abandoned.

[52] U.S. Cl. .............................. 260/240 R; 96/120; 96/130; 96/131; 96/143; 260/240.1; 260/240.4; 260/240.6; 260/240.9; 260/250 BC; 260/260; 260/288 R; 260/298; 260/304 R; 260/306.7 R; 260/307 D; 260/309; 260/309.2

[51] Int. Cl.² ......................................... C09B 23/00

[58] Field of Search ........ 260/240 R, 240.6, 240.65

[56] References Cited

UNITED STATES PATENTS 3,414,568  12/1968  Collet et al. ................. 260/240.6

FOREIGN PATENTS OR APPLICATIONS 373,160  5/1932  United Kingdom ........... 260/240 R
418,561  1/1933  United Kingdom ............ 260/240.2

OTHER PUBLICATIONS

Bourson, Bull. Soc. Chim. France, 1975, pp. 644–646.
Mee, J. Am. Chem. Soc. vol. 96, pp. 4712 to 4714 (1974).
Eiter et al., Annalen Der Chemie, vol. 682, pp. 62–70 (1965).
Selvarajan et al., J. Org. Chem. vol. 36, pp. 1679 to 1682 (1971).
Hamer, The Cyanine Dyes and Related Compounds, pp. 89, 464 and 478, Interscience Publishers (NY) 1964.

*Primary Examiner*—John D. Randolph
*Attorney, Agent, or Firm*—J. G. Levitt

[57] ABSTRACT

Novel methyne dyes comprising two auxochromic groups of the type used in a cyanine or merocyanine dye linked by a carbon atom chain wherein each of the carbon atoms have an unsaturated linkage to at least one adjacent carbon atom in the chain and at least one pair of carbon atoms in the chain being joined by a triple bond or, in an alternate resonance form, the chain including three consecutive carbon to carbon double bonds. The dyes are useful as spectral sensitizing dyes for silver halide emulsions and as intermediates for synthesizing chain-substituted methine dyes.

6 Claims, No Drawings

METHYNE DYES AND PHOTOGRAPHIC ELEMENTS

This is a continuation-in-part of my copending application Ser. No. 375,974 filed July 2, 1973, now abandoned.

This invention relates to new chemical compounds and to their preparation and use. More particularly, it relates to a new class of dyes and to their preparation and use as spectral sensitizers for photographic silver halide emulsions and as intermediates in the formation of chain-substituted dyes.

It is known to produce quaternary salts of diheteroatomic acetylenic compounds by the reaction of an orthosubstituted aniline with acetylenic acid chlorides. For example, Pierre Collet et al. U.S. Pat. No. 3,414,658 issued Dec. 3, 1968 describes the preparation of a diheteroatomic quaternary salt having an acetylenic linkage which may then be reacted with a nitrogen-containing heterocyclic compound containing a reactive methyl or methylene group to form a meso-substituted dye. However, up to now, only the quaternary salts of diheteroatomic acetylenic compounds have been prepared. Attempts to prepare acetylenic dyes have failed.

It is therefore, an object of this invention to provide a new class of dyes that contain acetylenic linkages or three consecutive double bonds.

Another object is to provide a method for preparing the new dyes of this invention.

Still another object of this invention is to provide a new class of dyes that function as spectral sensitizers for photographic silver halide emulsions.

Another object of this invention is to provide a new class of dyes that can be used as intermediates in the formation of chain-substituted dyes.

Other objects of this invention will be apparent from this disclosure and the appended claims.

The new dyes are the methyne dyes. By methyne dyes I mean dyes having two auxochromic groups of the type used in a cyanine or mercocyanine dye linked by a carbon atom chain wherein each of the carbon atoms in the chain have an unsaturated linkage to at least one adjacent carbon atom in the chain, at least one pair of carbon atoms in the chain being joined by a triple bond or, in an alternate resonance form, the chain including three consecutive carbon to carbon double bonds.

The novel methyne dyes of this invention include those represented by the following formula:

I. 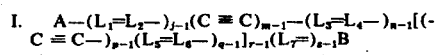

wherein $L_1$, $L_2$, $L_3$, $L_4$, $L_5$, $L_6$ and $L_7$ each represent a methine group, i.e., —CH=, —C(R)=, where R may be alkyl of 1 to 10 carbon atoms, aryl of 6 to 20 carbon atoms or where R or any 2 or more R's may represent the elements necessary to complete a heterocyclic or (aliphatic or aromtic) carbocyclic ring; $j$, $m$, $n$, $p$, $q$, $r$ and $s$ each are positive integers of 1 to 3, provided that when $j$, $n$, $p$, $q$, $r$ and $s$ are 1, $m$ is at least 2 and where $m$ is 1, $r$ and $p$ are both greater than 1; A and B are the same or different auxochromic groups (including associated anions) of the type used in methine dyes such as cyanine and merocyanine dyes with the proviso that when A and B are auxochromic groups of the type found in a cyanine dye $s$ is at least 2.

From the foregoing it is then apparent that the two auxochromic groups of the type found in a cyanine or merocyanine dye are linked by a carbon atom chain wherein each of the carbon atoms have an unsaturated linkage to at least one adjacent carbon atom in the chain and at least one pair of carbon atoms in the chain is joined by a triple bond. In an alternate resonance form from that shown, instead of one or more carbon to carbon triple bonds being present in the chain three consecutive carbon to carbon double bonds will link the carbon atoms of the chain in place of each carbon to carbon triple bond.

A and B can, for example, be selected from the following auxochromic groups:

 (1)

 (2)

 (3)

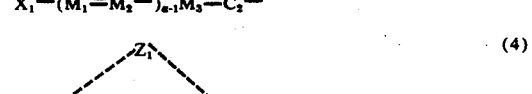 (4)

 (5)

 (6)

 (7)

 (8)

 (9)

 (10)

wherein $M_1$, $M_2$ and $M_3$ are methine linkages; $a$ is a positive integer of 1 to 3; $X_1$ represents the atoms O or S or the group N—$R_1$ where $R_1$ is alkyl of 1 to 10 carbon atoms or aryl of 6 to 20 carbon atoms; $R_4$ and $R_5$ each independently represent alkyl of 1 to 10 carbon atoms, aryl of 6 to 20 carbon atoms or $R_4$ and $R_5$ taken together represent the atoms necessary to complete a heterocyclic or (aliphatic or aromatic) carbocyclic ring; $G_1$ represents one of the following groups: O, S, Se,

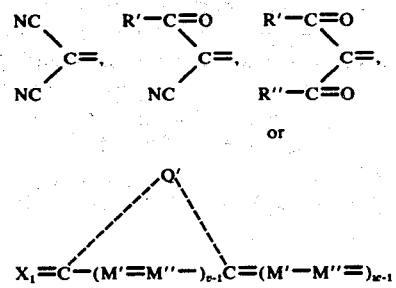

or $$X_1=\overset{Q'}{\overset{|}{C}}-(M'=M''-)_{v-1}C=(M'-M''=)_{w-1}$$

where R' and R" are alkyl of 1 to 10 carbon atoms, aryl of 6 to 20 carbon atoms, or, taken together, represent the elements necessary to complete a carbocyclic or a heterocyclic ring; v and w are positive integers of 1 to 3; M' and M" are methine linkages; $X_1$ is as defined above and Q' is as defined below.

In the various discussions of the possible R substituents, by alkyl of 1 to 10 carbon atoms I mean groups such as methyl, ethyl, n-propyl, isobutyl, decyl, β-methoxyethyl, β-ethoxyethyl, β-hydroxyethyl, β-hydroxypropyl, γ-hydroxypropyl, benzyl (phenylmethyl), β-phenylethyl, carboxymethyl, β-carboxyethyl, γ-carboxypropyl, α-carboxyethyl, carbmethoxymethyl, β-carbmethoxyethyl, carbethoxymethyl, β-carbethoxyethyl, β-acetoxyethyl, β-sulfoethyl, p-sulfobenzyl (p-sulfophenylmethyl), sulfomethyl, γ-sulfopropyl, etc. By aryl of 6 to 20 carbon atoms I mean aryl groups such as phenyl, naphthyl, anthryl, alkylphenyl, chlorophenyl, alkoxyphenyl, etc.

$Z_1$ in the above structures represents the atoms necessary to complete a nucleus of the type used in cyanine dyes, which nucleus typically contains a heteroatom such as nitrogen, oxygen, sulfur or selenium, such as one of the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naphtho[1,2-d]thiazole, 5-methoxynaptho[2,3-d]thlazole,5-ethoxynaphtho[2,3-d]thiazole, 8-methoxynaphtho[2,3-d]thiazole, 7-methoxynaphtho[2,3-d]thiazole, 4'-methoxythianaphtheno-7',6'-4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, naphtho[2,1-d]oxazole, naphtho[1,2,-d]oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc.; a 3,3-dialkylindolenine nucleus or a 3,3,5-trialkylindolenine nucleus, e.g., 3,3-dimethylindolenine, 3,3,5-trimethylindolenine, etc.; and an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-1H-naphth[1,2-d]imidazole, 1-aryl-3H-naphth[1,2-d]imidazole, 1-alkyl-5-methoxy-1H-naphth[1,2-d]imidazole, wherein the alkyl group has 1 to 4 carbon atoms and the aryl group 6 to 20 carbon atoms, etc.

$Q_1$ and Q' represent the non-metallic atoms required to complete a 5- or 6-membered carbocyclic nucleus such as, for example, cyclopentane, cyclohexane, etc. or a heterocylic nucleus of the type used in a merocyanine dye which typically contains at least one heteroatom selected from nitrogen, sulfur, selenium, and oxygen, such as 2-pyrazolin-5-one nucleus (e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.); an isoxazolone nucleus (e.g., 3-phenyl-5-(4H)-isoxazolone, 3-methyl-5-(4H)-isoxazolone, etc.); an oxindole nucleus (e.g., 1-alkyl-2,3-dihydro-2-oxindoles, etc.), a 2,4,6-triketohexahydropyrimidine nucleus (e.g., barbituric acid or 2-thiobarbituric acid as well as their 1-alkyl (e.g., 1-methyl, 1-ethyl, 1-propyl, 1-heptyl, etc.) or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc., or 1,3-diaryl (e.g., 1,3-diphenyl, 1,3-di(p-chlorophenyl), 1,3-di(p-ethoxycarbonylphenyl), etc.), or 1-aryl (e.g., 1-phenyl, 1-p-chlorophenyl, 1-p-ethoxycarbonylphenyl), etc. or 1-alkyl-3-aryl (e.g., 1-ethyl-3-phenyl, 1-n-heptyl-3-phenyl, etc.) derivatives); a rhondanine nucleus (i.e., 2-thio-2,4-thiazolidinedione series), such as rhodanine, 3-alkylrhodanines (e.g., 3-ethylrhodanine, 3-allylrhodanine, etc.), 3-carboxyalkylrhodanines (e.g., 3-(2-carboxyethyl)rhodanine, 3-(4-carboxybutyl)rhodanine, etc.), 3-sulfoalkylrhodanines (e.g., 3-(2-sulfoethyl)rhodanine, 3-(3-sulfopropyl)rhodanine, 3-(4-sulfobutyl)rhodanine, etc.), or 3-arylrhodanines (e.g., 3-phenylrhodanine, etc.), etc; a 2(3H)-imidazo-[1,2-α]-pyridone nucleus; a 5,7-dioxo-6,7-dihydro-5-thiazolo[3,2-α]-pyrimidine nucleus (e.g., 5,7-dioxo-3-phenyl-6,7-dihydro-5-thiazolo[3,2-α]pyrimidine, etc.); a 2-thio-2,4-oxazolidinedione nucleus (i.e., those of the 2thio-2,4(3H,5H)-oxazoledione series) e.g., 3-ethyl-2-thio-2,4-oxazolidinedione, 3-(2-sulfoethyl)-2-thio-2,4-oxazolidinedione, 3-(4-sulfobyutyl)-2-thio-2,4-oxazolidinedione, 3-(3-carboxypropyl)-2-thio-2,4-oxazolidinedione, 3-(3-carboxypropyl)-2-thio-2,4-oxazolidinedione, etc.); a thianaphthenone nucleus (e.g., 3-(2H)-thianaphthenone, etc.); a 2-thio-2,5-thiazolidinedione nucleus (i.e. the 2-thio- 2,5-(3H,4H)-thiazoledione series) (e.g., 3-ethyl-2-thio-2,5-thiazolidinedione, etc.); a 2,4-thiazolidinedione nucleus (e.g., 2,4-thiazolidinedione, 3-ethyl-2,4-thiazolidinedione, 3-phenyl-2,4-thiazolidinedione, 3-α-naphthyl-2,4-thiazolidinedione, etc.); a thiazolidinone nucleus (e.g., 4-thiazolidinone, 3-ethyl-4-thiazolidinone, 3-phenyl-4-thiazolidone, 3-α-naphthyl-4-thiazolidinone, etc.); a 2-thiazolin-4-one series (e.g., 2-ethylmercapto-2-thiazolin-4-one, 2-alkylphenylamino-2-thiazolin-4-one, 2-diphenylamino-2-thiazolin-4-one, etc.); a 2-imino-4-oxazolidinone (i.e. pseudohydantoin nucleus); a 2,4-imidazolidinedione (hydantoin) series (e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-3-α-naphthyl-2,4-imidazolidinedione, 1,3-diphenyl-2,4-imidazolidinedione, etc.); a 2-thio-2,4-imidazolidinedione (i.e., 2-thiohydantoin) nucleus (e.g., 2-thio-2,4-imidazolidinedione, 3-ethyl-2-thio-2,4-imidazolidinedione, 3-(4-sulfobutyl)-2-thio-2,4-imidazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc.); a 2-imidazolin-5-one nucleus (e.g., 2-propylmercapto-2-imidazolin-5-one, etc.).

The dyes of this invention provide spectral sensitization of photographic silver halide emulsions. Photographic silver halide emulsions which may be so sensitized can comprise, for example, silver chloride, silver bromide, silver bromoiodide, silver chlorobromide, silver chloroiodide, silver chlorobromoiodide crystals or mixtures thereof. The emulsions can be coarse or fine grain emulsions and can be prepared by a variety of techniques, e.g., single jet emulsions such as those described in Trivelli and Smith, *The Photographic Journal*, Vol. LXXIX, May 1939 (pp. 330–338), double jet emulsions such as Lippmann emulsions, ammoniacal emulsions, thiocyanate or thioether ripened emulsions such as those described in Nietz et al. U.S. Pat. No. 2,222,264 issued Nov. 19, 1940; Illingsworth U.S. Pat. No. 3,320,069 issued May 17, 1967 and McBride U.S. Pat. No. 3,271,157 issued Sept. 6, 1966. Silver halide emulsions can form latent images predominantly on the surface of the silver halide grains, or predominantly on the interior of the silver halide grains such as those described in Davey et al. U.S. Pat. No. 2,592,250 issued May 8, 1952; Porter et al. U.S. Pat. No. 3,206,313 issued Sept. 14, 1965; Berriman U.S. Pat. No. 3,367,778 issued Feb. 6, 1968 and Bacon et al. U.S. Pat. No. 3,447,927 issued June 3, 1969. If desired, mixtures of such surface and internal image-forming emulsions can be made, such being described in Luckey et al. U.S. Pat. No. 2,996,382 issued Aug. 15, 1961. Silver halide emulsions can be regular grain emulsions such as the type described in Klein and Moisar, *J. Phot. Sci.*, Vol. 12, No. 5, Sept./Oct., 1964, pp. 242–251. Negative type emulsions can be made, as well as direct positive emulsions as described in Leermakers U.S. Pat. No. 2,184,013 issued Dec. 19, 1939; Kendall et al U.S. Pat. No. 2,541,472 issued Feb. 13, 1951; Schouwenaars British Pat. No. 723,019 issued Feb. 2, 1955; Illingsworth et al. French Pat. No. 1,520,821 issued Mar. 4, 1968; Illingsworth U.S. Pat. No. 3,501,307 issued Mar. 17, 1970; Ives U.S. Pat. No. 2,563,785 issued Aug. 7, 1951; Knott et al. U.S. Pat. No. 2,456,953 issued Dec. 21, 1948 and Land U.S. Pat. No. 2,861,885 issued Nov. 25, 1958.

The silver halide emulsions can be unwashed or washed to remove soluble salts after precipitation of the silver halide. In the latter case, the soluble salts can be removed by chill-setting and leaching or the emulsion can be coagulation washed, e.g., by the procedures described in Hewitson et al. U.S. Pat. No. 2,618,556 Nov. 18, 1952; Yutzy et al. U.S. Pat. No. 2,614,928 issued Oct. 21, 1952; Yackel U.S. Pat. No. 2,565,418 issued Aug. 21, 1951; Hart et al. U.S. Pat. No. 3,241,969 issued Mar. 22, 1966 and Waller et al. U.S. Pat. No. 2,489,341 issued Nov. 29, 1949.

The dyes of this invention are advantageously incorporated in a washed, finished emulsion and should be uniformly distributed throughout the emulsion. The dyes can be added from solutions in appropriate solvents which are compatible with the emulsion and which are substantially free from deleterious effects on the light-sensitive materials.

The types of silver halide emulsions that can be sensitized with the new dyes of this invention include those prepared with hydrophilic colloids that are known to be satisfactory vehicles for dispersed silver halides, for example, emulsions comprising both naturally-occurring substances such as proteins, for example, gelatin, gelatin derivatives, cellulose derivatives, polysaccharides such as dextran, gum arabic and the like; and synthetic polymeric substances such as water-soluble polyvinyl compounds like poly(vinylpyrrolidone), acryamide polymers and the like. The photographic emulsions can also contain alone or in combination with hydrophilic, water-permeable colloids, other synthetic polymeric vehicle compounds such as dispersed vinyl compounds such as in latex form and particularly those which increase the dimensional stability of the photographic materials. Typical synthetic polymers include those described in Nottorf U.S. Pat. No. 3,142,568 issued July 28, 1964; White U.S. Pat. No. 3,193,386 issued July 6, 1965; Houck et al. U.S. Pat. No. 3,062,674 issued Nov. 6, 1962; Houck et al. U.S. Pat. No. 3,220,844 issued Nov. 30, 1965; Ream et al. U.S. Pat. No. 3,287,289 issued Nov. 22, 1966; and Dykstra U.S. Pat. No. 3,411,911 issued Nov. 19, 1968. Other vehicle materials include water-insoluble polymers of alkyl acrylates and methacrylates, acrylic acid, sulfoalkyl acrylates or methacrylates, those which have cross-linking sites which facilitate hardening or curing as described in Smith U.S. Pat. No. 3,488,708 issued Jan. 6, 1970, and those having recurring sulfobetaine units as described in Dykstra Canadian Pat. No. 774,054.

The concentration of the new dyes in the emulsion can vary widely, e.g., from about 25 to 1000 mg. per mole of silver in the flowable emulsion. The specific concentration will vary according to the type of light-sensitive material in the emulsion and the effects desired. The suitable and most economical concentration for a given emulsion will be apparent to those skilled in the art upon making the tests and observations customarily used in the art of emulsion making.

To prepare a gelatin-silver halide emulsion sensitized with one of the dyes of this invention, the following procedure is satisfactory. A quantity of the dye is dissolved in a suitable solvent and a volume of this solution containing from 25 to 1000 mg. of dye per mole of silver is slowly added to the gelatin-silver halide emulsion. With most of the dyes, 50 to 500 mg. of dye per mole of silver suffices to produce the maximum sensitizing effect with the ordinary gelatin-silver bromide (including bromoiodide and chlorobromide) emulsions. With fine grain emulsions, which include most of the ordinarily employed gelatin-silver chloride emulsions, somewhat larger concentrations of dye may be necessary to obtain the optimum sensitizing effect. While this procedure has dealt with emulsions comprising gelatin, it will be appreciated that these remarks apply generally to any emulsion wherein all or part of the gelatin is substituted by another suitable hydrophilic colloid as mentioned above. Binderless light-sensitive silver halide grains can also be spectrally sensitized with the dyes of this invention.

Photographic silver halide emulsions spectrally sensitized in accordance with this invention can contain the chemical sensitizers, stabilizers, antifoggants, development modifiers, hardeners, vehicles, plasticizers, coating aids, other spectral sensitizing dyes, etc., and can be coated on supports, such as those described and referred to in Product Licensing Index, Vol. 92, December, 1971, publication 9232, pages 107–110. Such emulsions are useful in photographic elements which may contain developing agents, antistatic layers, matting agents, brighteners, absorbing and filter dyes, color-forming couplers, etc., described and referred to in the above-mentioned Product Licensing Index, pages 108–110. Processing of photographic silver halide grains spectrally sensitized in accordance with this invention can be accomplished by the methods described and referred to on page 110 of the above-identified Product Licensing Index.

The above defined methyne dyes without desensitizing nuclei are useful as sensitizing dyes in the negative silver halide emulsions, while dyes containing desensitizing nuclei are powerful desensitizers for light-sensitive photographic silver halide emulsions and may be used when desensitization by means of dyes is required. The dyes absorb strongly and sharply, and their colors are uniform and deep. The dyes are also useful as intermediates in the formation of chain-substituted dyes. The dye compounds can also be used as biological stains.

In accordance with the invention, I prepare the methyne dye compounds defined by the above Formula I by several methods. Since the methyne dyes of this invention are related to known methine dyes they can be conveniently referred to as methine dye analogs or acetylenic analogs of cyanine and merocyanine dyes.

Preferred methyne dyes of this invention include the cyanine and merocyanine dye analogs represented by the following general formulas:

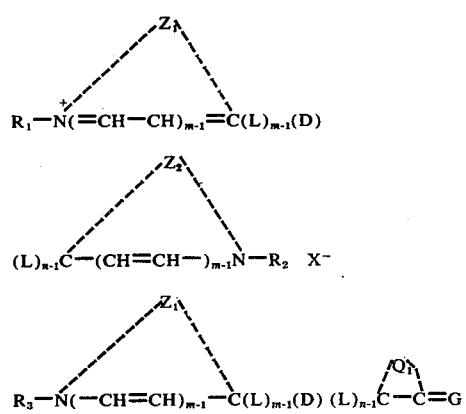

wherein X is an acid anion such as Cl⁻, Br⁻, I⁻, p-toluene-sulfonate, etc., $m$ and $n$ each represents positive integers of from 1 to 3, $R_1$, $R_2$ and $R_3$ each are independently selected from the group consisting of hydrogen, an alkyl group of 1 to 10 carbon atoms and an aryl group of 6 to 20 carbon atoms; G is oxygen or sulfur, D is (—C≡C—) or in an alternate resonance form (=C=C=); L is a methine linkage, e.g., —CH=, —C(CH₃)=, —C(C₆H₅)=, etc.; and $Z_1$ and $Q_1$ are as previously defined. $Z_2$ can be as previously defined for $Z_1$. In formula II the number of carbon atoms in the chain is always an odd number while formula III the number of carbon atoms in the chain is always an even number.

Acetylenic analogs of cyanine dyes of formula II are prepared to advantage according to one method of this invention by reacting a ketone of the type described in U.S. Pat. No. 2,520,358 and having the formula:

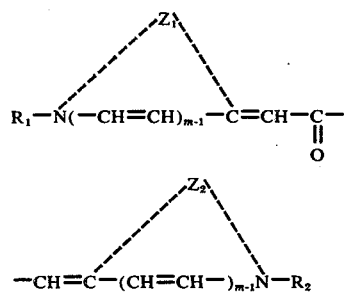

wherein $m$, and $R_1$ and $R_2$ are as previously defined and $Z_1$ and $Z_2$ are the same and are as previously defined, with a dehydration catalyst such as an acid halide, i.e. phosphoryl chloride, etc. Generally, temperatures around room temperature can be used. The reactions may be carried out in the presence of a basic solvent such as pyridine.

The above process is illustrated by the following reaction steps for the preparation of a typical methyne dye:

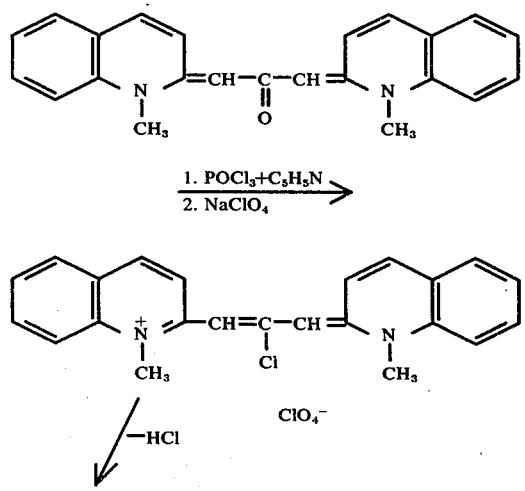

-continued

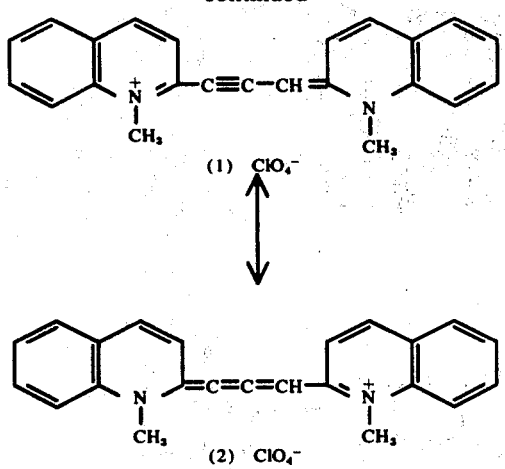

The resultant acetylenic dye is a resonance hybrid which can be represented by canonical forms such as (1) and (2). In (1) the dye chain is a vinyl acetylene and in (2) a cumulene. The loss of H-halide such as HCl apparently results from crowding within the dye structure.

The cyanine dye analogs of formula II can also be prepared by reacting a compound having a halogen substituted 1-alkenyl group with a quaternary salt having a displaceable group such as a halogen, sulfonate, alkylthio, hydroxyiminomethyl, etc. Exemplary of the quaternary salts are those usually used in cyanine dye synthesis such as the substituted sulfo-betaines, alkyl-thio substituted salts, etc. Generally, temperatures varying from room temperature to about ice bath temperature for the reaction mixture can be used. The reactions are carried out in an inert solvent such as, for example, acetonitrile, dimethylformamide, dimethylacetamide, etc., in the presence of a basic condensing agent such as, for example, trialkyl amines (e.g., triethylamine, tri-n-propylamine, tri-n-butylamine, etc.), N-methylpiperidine, N-ethylpiperidine, etc. The above process is illustrated by the following reaction steps for the preparation of a typical methyne dye:

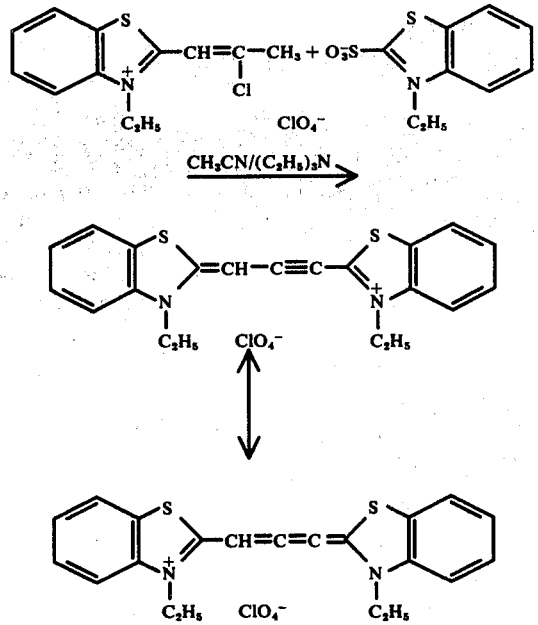

When methyne dyes containing two different nuclei are prepared by the above method, the triple bond in the dye is remote from that nucleus which forms part of the halogen substituted alkenyl salt, for example:

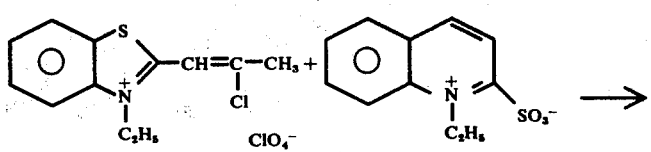

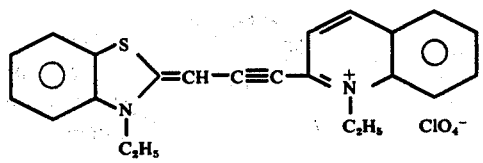

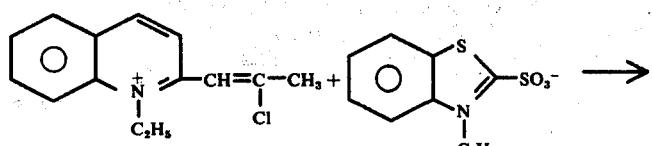

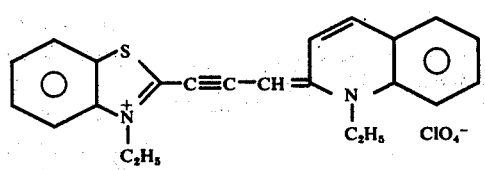

A thermodynamic equilibrium mixture of the above two isomeric dyes A and A' can be obtained when a solution of either isomer in an inert solvent is treated with a trace of a suitable acid, for example, perchloric acid, acetic or fluoroboric acid.

Another novel method for preparing the new cyanine dye analogs of formula II involves the heating of a heterocyclic reactive-methylquaternary salt of the formula:

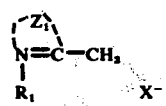

wherein $Z_1$ completes a heterocyclic nucleus of the type used in a cyanine dye and $R_1$ is as defined above, in a mixture of carbon tetrahalide, e.g. $CCl_4$, $CBr_4$, and a basic aqueous solution such as an alkali metal hydroxide, e.g., an aqueous sodium hydroxide or potassium hydroxide solution. Reflux temperatures at atmospheric pressure can be used. This reaction can be represented by the following reaction sequence:

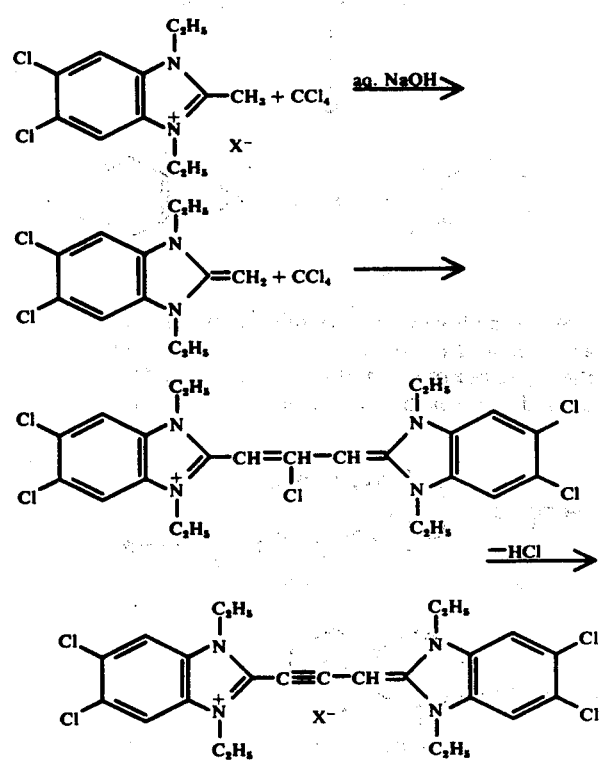

The acetylenic analogs of the merocyanine dyes of formula III can be prepared according to one method by reaction of a methylene base of the formula:

wherein $R_3$ $Z_1$ and m are as previously defined, with a nitrogen-containing heterocyclic compound having the formula:

wherein G is oxygen or sulfur and $Q_1$ is as defined previously, with carbon tetrahalide, e.g., carbon tetrabromide, in an aromatic hydrocarbon solvent such as benzene, toluene, etc. The process is illustrated by the following reaction steps for the preparation of a typical methyne dye with the resultant merocyanine dye analog represented in both canonical forms.

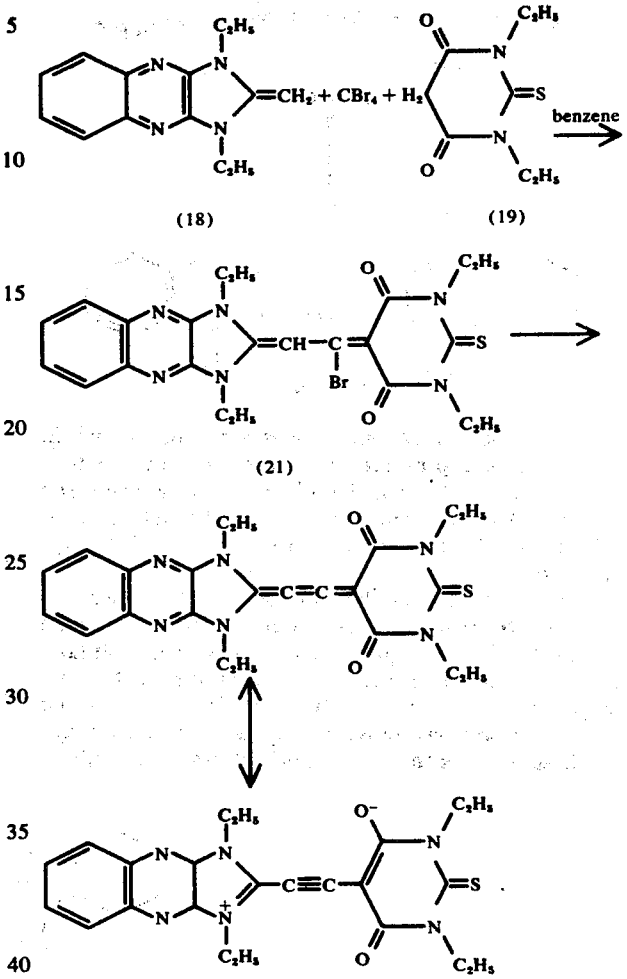

The merocyanine acetylenic analogs of formula III can also be prepared by reacting a —OH chain-substituted merocarbocyanine as described in Knott, *J. Chem. Soc.* 1954, 1490 and having the formula

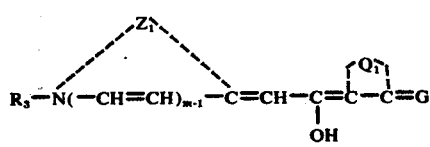

wherein m, n, R, G, $Z_1$ and $Q_1$ are as defined above, with a halogenating agent such as phosphoryl chloride, etc., in the presence of a base such as pyridine to replace the hydroxy group and form a halogen substituted dye which can then be isolated and dehydrohalogenated with a suitable base such as a tertiary amine, for example, a trialkylamine in acetonitrile to form the methyne dye. Temperatures of from about room up to reflux at atmospheric pressure can be used. In some cases, the methyne dye can be formed in a one-step reaction. This process is illustrated by the following reaction steps for the preparation of a typical methyne dye:

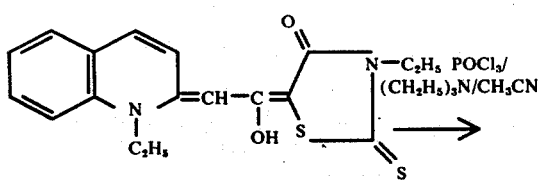

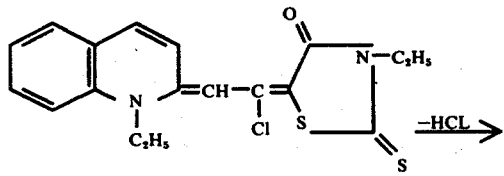

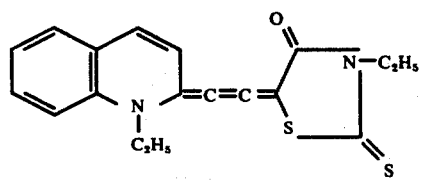

the β-hydroxy merocarbocyanine dyes of Knott can also be used in a variation of the above process wherein the dye is first halogenated at the α-position followed by formation of the methyne dye. In a prepared process a β-hydroxy merocarbocyanine dye is halogenated and then treated with a tri-substituted phosphine such as triphenylphosphine in a suitable solvent such as acetonitrile containing a tertiary amine such as a trialkylamine. This process is illustrated by the following reaction steps for the preparation of a typical methyne dye.

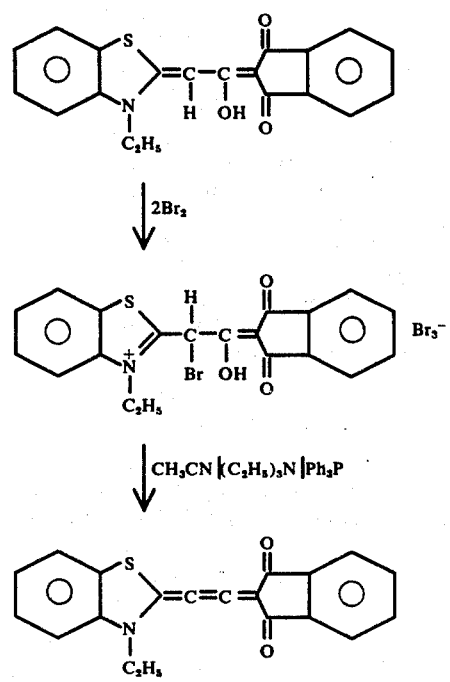

The process according to this invention are used advantageously to prepare a great number of cyanine and merocyanine acetylenic dye analogs. The methyne dyes so produced are useful in sensitizing negative and direct positive silver halide photographic emulsions. The methyne dyes are also useful as intermediates in the synthesis of chain-substituted dyes. Chain-substituted dyes can be formed from both the cyanine and merocyanine acetylenic dye analogs of this invention. Under basic conditions, weakly acidic compounds, such as alcohols, thiols, etc. will readily add across the triple bond. This process is illustrated by the following reaction steps for the preparation of a typical chain-substituted cyanine dye.

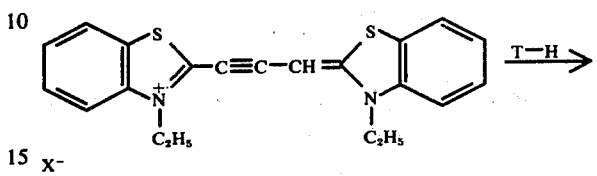

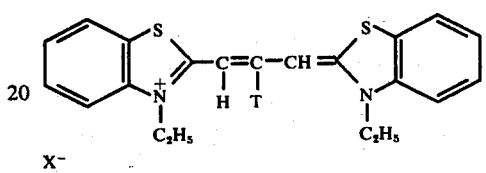

wherein T is an RO— or RS— group where R is alkyl or aryl.

Under acidic conditions acids such as the acid halides, e.g. Cl⁻, Br⁻, I⁻ etc. will readily add across the triple bond or one of the three consecutive double bonds. This process is illustrated by the following reaction steps for the preparation of a typical chain-substituted merocyanine dye.

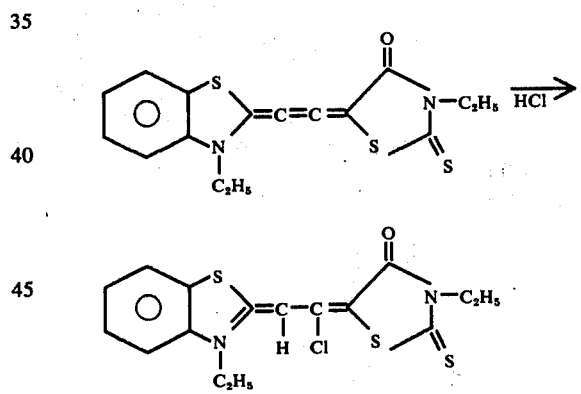

Chain-substituted cyanine dyes can be prepared in a similar manner. Among the weakly acidic compounds which will add under basic or acidic conditions are the ketomethylene compounds which yield allopolarcyanine dyes such as illustrated in the following reaction sequence:

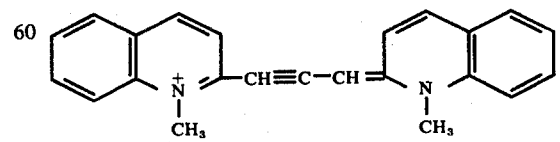

dimethyl formamide
1,3-diethyl-2-thiobarbituric acid

-continued

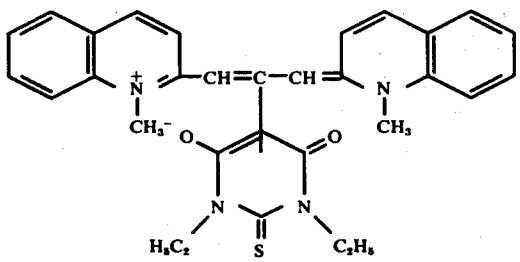

The following examples are included for a further understanding of the invention.

EXAMPLE 1

Preparation of 1-Methyl-2-[(1-methyl-2(1H)-quinolylidene)-1-propynyl]quinolinium perchlorate.

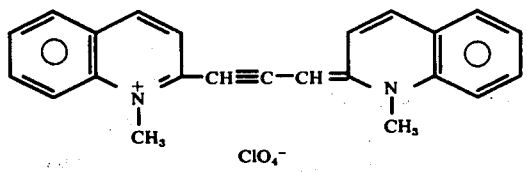

Phosphoryl chloride (1.0 ml) is added to a stirred suspension of 1,3-Bis(1-methyl-2-(1H)-quinolylidene-)acetone (0.68 g, 0.002 mol) in pyridine (10 ml). The mixture is stirred for 5 min., then the solid is collected and washed with a little pyridine, then with ether. The dye is converted to its perchlorate salt by solution in methanol, followed by addition of aqueous sodium perchlorate solution. After recrystallization from acetonitrile, the yield of purified dye is 0.30 g (36%) with the melting point indistinct. The following two dyes were prepared by procedures similar to that described above: 1,3-Diethyl-2-[(1,3-diethyl-1H-imidazo[4,5-b]quinoxalin-2-(3H)-ylidene)-1-propynyl]-1H-imidazo[4,5-b]quinoxalinium perchlorate.

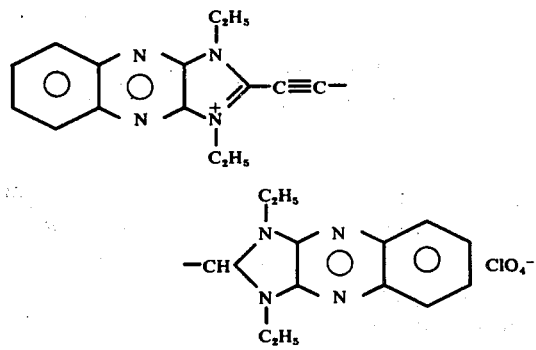

Recrystallized from acetonitrile. Purified yield 35%. mp > 300°. 1,3,3-Trimethyl-2-[(1,3,3-trimethyl-2-indolinylidene)-1-propynyl]-3H-indolium perchlorate.

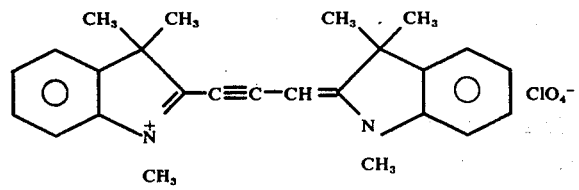

Recrystallized from methanol. Purified yield 43% mp 194–7° dec.

EXAMPLE 2

Preparation of 5,6-Dichloro-1,3-diethyl-2[(5,6-dichloro-1,3-diethyl-2-benzimidazolinylidene)-1-propynyl]benzimidazolium p-toluene sulfonate.

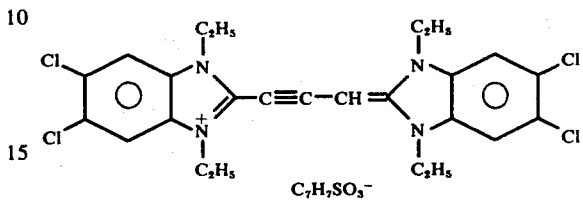

A mixture of 5,6-Dichloro-1,3-diethyl-2-methylbenzimidazolium p-toluenesulfonate (12.9 g, 0.03 mol), 5N NaOH (150 ml) and carbon tetrachloride (300 ml) are heated at reflux, with vigorous stirring, for 15 min. The mixture is allowed to cool slightly, then the dye is collected and washed well with water, then with ether. After recrystallization from methanol, the yield of purified dye is 5.55 g (51%) mp 280–2° dec.

EXAMPLE 3

Preparation of 3-Ethyl-2-[(3-ethyl-2-benzothiazolinylidene)-1-propynyl]benzothiazolium perchlorate

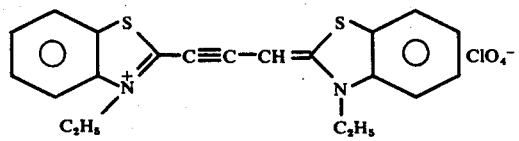

Triethylamine (2.1 ml, 0.015 mol) is added to a stirred suspension of 2-(2-Chloropropenyl)-3-ethyl-benzothiazolium perchlorate (1.70 g, 0.005 mol) and Anhydro-3-ethyl-2-sulfobenzothiazolium hydroxide (1.22 g, 0.005 mol) in acetonitrile (25 ml). The mixture is stirred for 4 minutes, filtered, and the filtrate is slowly diluted to 200 ml. with ether. The ether is decanted and the viscous residue is stirred with methanol and chilled. The dye is collected and recrystallized from ethanol to yield 0.45 g (20%) of purified dye, mp indistinct.

EXAMPLE 4

Preparation of 5,6-Dichloro-1,3-diethyl-2[(3-ethyl-2-benzothiazolinylidene)-1-propynyl]benzimidazolium perchlorate.

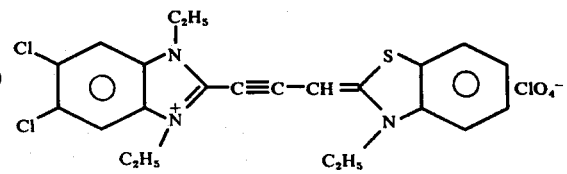

Triethylamine (2,8 ml; 0.02 mol) is added to a stirred suspension of 5,6-Dichloro-1,3-diethyl-2-hydroxyiminomethyl benzimidazolium iodide (1.83 g, 0.005 mol), 2-(2-chloropropenyl)-3-ethyl benzothiazolium perchlorate and acetic anhydride (0.64 g, 0.006 mol) in acetonitrile (25 ml). The mixture is stirred for 5 minutes, then diluted to 200 ml with ether. The ether is decanted and the residue treated with methanol (25 ml) and chilled. After recrystallization from methanol, the yield of purified dye is 0.37 g (14%) mp indistinct.

EXAMPLE 5

Preparation of 1-Ethyl-2-[(3-ethyl-2-benzothiazolinylidene)-1-propynyl]quinolinium perchlorate.

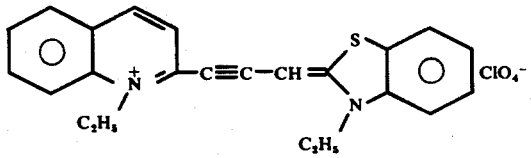

Triethylamine (2.1 ml, 0.015 mol) is added to a stirred suspension of 2-(2-chloropropenyl)-3-ethylbenzothiazolium perchlorate and anhydro-1-ethyl-2-sulfoquinolinium hydroxide (1.19 g, 0.005 mol) in acetonitrile. The mixture is stirred for 5 minutes, filtered, and the filtrate is diluted to 200 ml. with ether. The ether is decanted and the residue treated with methanol (25 ml). After chilling, the solid is collected and recrystalized from methanol. The yield of purified dye is 0.32 g (14%) mp indistinct.

The following three dyes are prepared from the appropriate intermediates, by procedures similar to that described in Example 5.

3-Ethyl-2-[(1-ethyl-2-(1H)-quinolinylidene)-1-propynyl]benzothiazolium perchlorate.

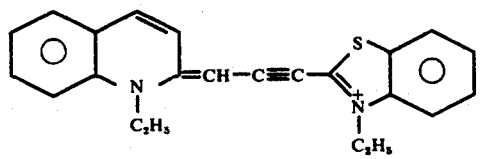

yield 29% mp indistinct.

3Methyl-2-[(1-methylnaphtho[1,2-d]thiazolin-2-ylidene)-1-propynyl]benzothiazolium perchlorate.

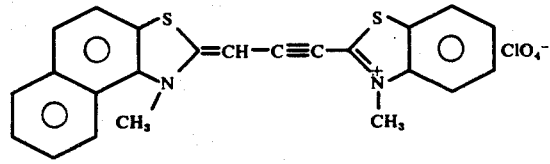

Yield 30% mp. indistinct.

1-Methyl-2-[(3-methyl-2-benzothiazolinylidene)-1propynyl]-naphtho[1,2-d]thiazolium perchlorate.

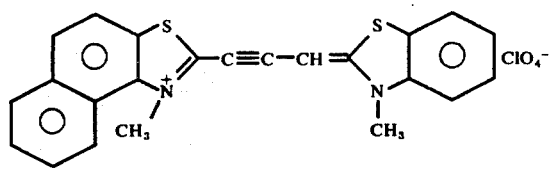

Yield 38% mp. indistinct.

In all four dyes formed according to the process of Example 5, the triple bond is remote from the nucleus which forms part of the chloropropenyl salt.

EXAMPLE 6

Preparation of 1,3-Diethyl-5-[(1,3-diethylimidazo[4,5-b]quinoxalin-2-ylidene]vinylidene-2-thiobarbituric acid.

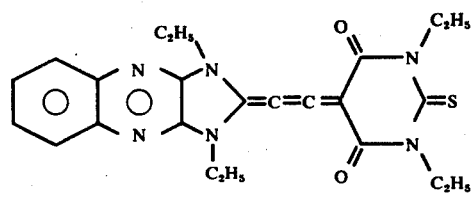

A solution of 1,3-Diethyl-1,2-dihydro-2-methyleneimidazo[4,5-b]quinoxaline (6.0 g, 0.025 mol), 1,3-diethyl-2-thiobarbituric aicd (5.0 g, 0.025 mol) and carbon tetrabromide (8.3 g, 0.025 mol) in benzene (60 ml) is warmed to 50°-55°, at which point an exothermic reaction occurs, with separation of solid. The mixture is allowed to cool, then filtered. The filtrate is evaporated to dryness, the residue treated with methanol (50 ml), and the solid dye collected. Treatment of the filtrate with triethylamine (5 ml) yields a further portion of dye. The dye is purified by precipitation from chloroform solution by addition of methanol. The yield of purified dye is 0.50 g, mp indistinct. The yield can be improved by using the quaternary salt and conducting the reaction in the presence of triethylamine.

EXAMPLE 7a

Preparation of Ethyl-2-(1-phenylacetonylidene)benzothiazoline

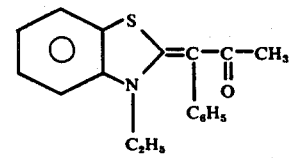

2-Benzyl-3-ethylbenzothiazolium p-toluenesulfonate (34 g, 0.008 mol), acetic anhydride (8.9 g, 0.088 mol) and dry pyridine (100 ml) are heated at reflux for 15 min., cooled and diluted with 1 liter of water. The oil which separates becomes crystalline on stirring. It is collected on a filter and washed with water. Yield 22.8 g (97%).

EXAMPLE 7b 2-(2-Chloro-1-phenylpropenyl)-3-ethylbenzothiazolium perchlorate

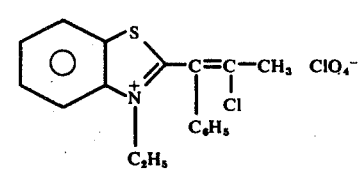

The ketone of Example 7a (2.95 g, 0.01 mol) and phosphoryl chloride (5 ml) are stirred 45 minutes at room temperature. The mixture is twice washed with anhydrous ether. The residue is dissolved in methanol (10 ml) and sodium perchlorate (1.22 g, 0.01 mol) in water (5 ml) added. After dilution to 50 ml with water, the solid is collected and washed with water. The yield is 3.70 g (90%).

EXAMPLE 8

The following two acetylenic analogs are prepared as described in Example 3 except that the salt of Example 7b is used as the chloro-alkenyl salt.

a.

3-Ethyl-2-[(3-ethyl-2-benzothiazolinylidene)-3-phenyl-1-propynyl]benzothiazolium perchlorate

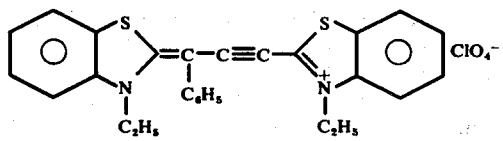

b.

1-Ethyl-2-[(3-ethyl-2-benzothiazolinylidene)-3-phenyl-1-propynyl]naphtho[1,2-d]thiazolium perchlorate

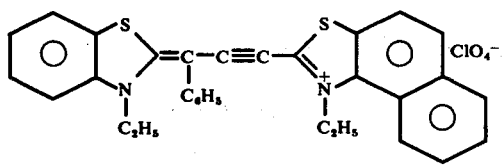

EXAMPLE 9

Preparation of 3-Ethyl-5-(3-ethyl-2-benzothiazolinylidene)-1-chloroethylidene]rhodanine.

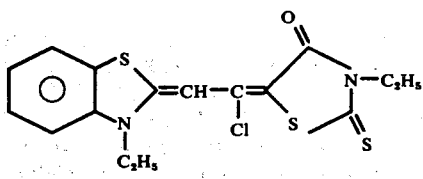

p-Toluenesulfonyl chloride (1.15 g, 0.006 mol) is added to 3-ethyl-5[(3-ethyl-2-benzothiazolinylidene)-1-hydroxyethylidene]rhodanine (1.82 g, 0.005 mol) in dry pyridine (15 ml). After stirring for 30 min. at room temperature, the solution is diluted with acetonitrile (25 ml), chilled and the dye collected, washed with acetonitrile, then ether. The yield is 0.74 g (39%).

Dyes of the class described by Knott, *J. Chem. Soc.* 1954, 1490, wherein merocarbocyanines having an —OH group on the chain carbon atom adjacent to the ketomethylene nucleus are described, can be used as the starting materials to form the merocyanine analogs of this invention.

EXAMPLE 10

Preparation of 3-Ethyl-5-[(3-ethyl-2-benzothiazolinylidene)-vinylidene]rhodanine.

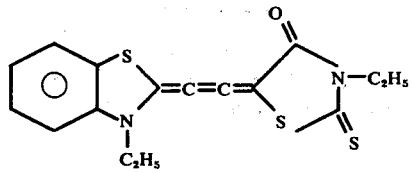

A mixture of the merocyanine dye of Example 9 (1 g), acetonitrile (100 ml), sodium iodide (5 g) and triethylamine (7 ml) are heated at reflux with stirring for 1 minute and chilled immediately. The dye is collected and washed sequentially with acetonitrile, water, acetonitrile and ether. After recrystallization from acetonitrile, the yield of purified dye is 0.57 g (63%).

EXAMPLE 11

Preparation of 3-Ethyl-5-[(1-ethyl-2(1H)-quinolylidene)vinylidene]rhodanine.

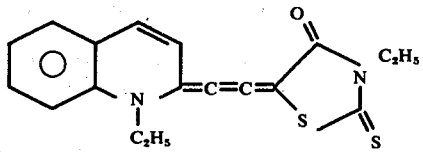

Phosphoryl chloride (1.0 ml) is added to a mixture of 3-Ethyl-5[(1-ethyl-2(1H)-quinolylidene)vinylidene]rhodanine (1.79 g, 0.005 mol), and triethylamine (2.1 ml, 0.005 mol) in dry acetonitrile (20 ml). The mixture is stirred for 30 min., with exclusion of moisture, chilled briefly, and the dye collected. It is washed with acetonitrile, methanol and ether. After recrystallization from acetonitrile, the yield of purified dye is 0.70 g (44%).

EXAMPLE 12

Several of the dyes are tested in a sulfur- and gold-sensitized, 0.2 μm cubic-grained gelatino-silver-bromoiodide emulsion containing 2.5 mole % iodide. The dyes are added to separate portions of the emulsion at the concentrations indicated and coated at 11 mg/dm² on a cellulose acetate support. A sample of each coating is exposed to a tungsten light source in a Eastman 1B Sensitometer through a wedge spectrograph and through a continuous step wedge, using a Kodak Wratten No. 16 filter (minus blue). The coatings are developed eight minutes in Kodak Developer DK-50 with the following results:

| Dye | Mole/mole Ag. | Sens. Max. nm | Sens. Range nm |
|---|---|---|---|
| 2 | $8.0 \times 10^{-4}$ | 525 | 390–570 |
| 3 | $6.0 \times 10^{-4}$ | 555 | 500–590 |
| 4 | $8.0 \times 10^{-4}$ | 515 | 390–580 |
| 6 | $2.0 \times 10^{-4}$ | 515 | 490–550 |
| 8(a) | $6.0 \times 10^{-4}$ | 580 | 510–630 |
| 8(b) | $2.0 \times 10^{-4}$ | 590 | 510–640 |

The following example illustrates the formation of various chain-substituted dyes from the novel acetylenic cyanine dyes of this invention.

EXAMPLE 13

1,3-Diethyl-5{bis[(1,3-diethyl-1H-imidazo[4,5-b]quinoxalin-2-(3H)-ylidene)methyl]methylene}-2-thiobarbituric acid.

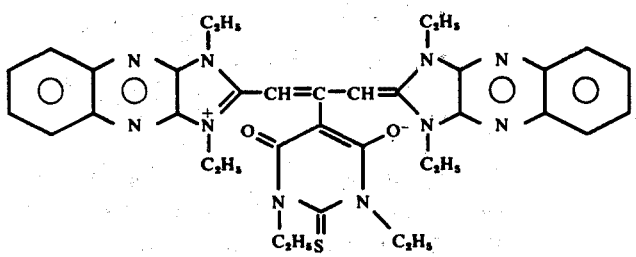

A mixture of 1,3-diethyl-2[(1,3-diethyl-1H-imidazo[4,5-b]quinoxalin-2-(3H)-ylidene)-1-propynyl]imidazo[4,5-b]-quinoxalinium perchlorate) 0.33 g, 0.0005 mol) of Example 1, 1,3-diethyl-2-thiobarbituric acid (0.11 g, 0.0005 mol) and triethylamine (0.10 g, 0.001 mol) in dimethylformamide (5 ml), is heated at reflux for 30 seconds. After cooling the solution is diluted to 20 ml. with water. The dye is collected and washed with water. After recrystallization from acetonitrile, the yield of purified dye is 0.27 g (79%) - mp. indistinct.

The following chain-substituted dyes were prepared by methods similar to that described for Example 13.

1,3-diethyl-5{ois[(1,3-diethyl-1H-imidazo[4,5-b]-quinoxalin-2-(3H)-ylidene)methyl]methylene}barbituric acid.

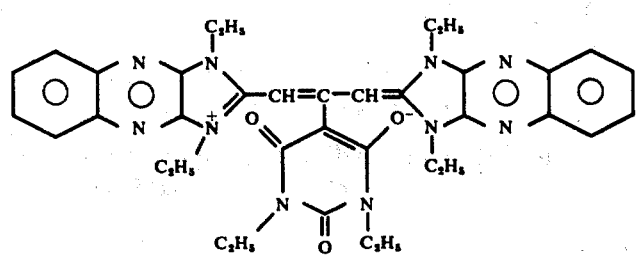

Recrystalization solvent: acetonitrile. Yield 42%, mp. indistinct.

3-Ethyl-5-{bis[(1,3-diethyl-1H-imidazo[4,5-b]-quinoxalin-2-ylidene)methyl]methylene}rhodamine.

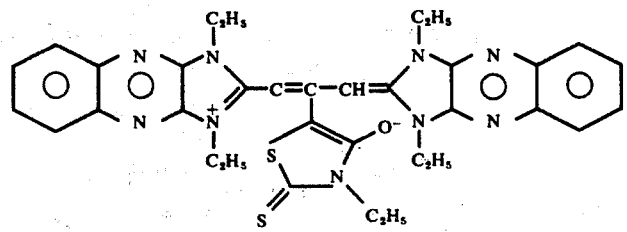

Recrystallization solvent: isopropanol. Yield 75%, mp. indistinct.

1,3-Diethyl-5-{bis[(1,3,3-trimethyl-2-indolinylidene)-methyl]methylene}-2-thiobarbituric acid.

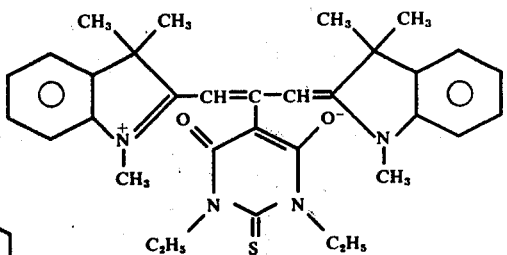

Recrystallization solvent: ethanol. Yield 27%, mp. 234–5°.

1,3-Diethyl-5-{bis[(1,3,3-trimethyl-2-indolinylidene)-methyl]methylene}barbituric acid.

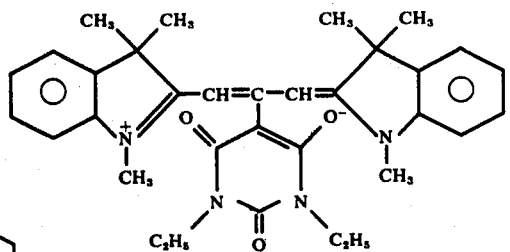

Recrystallization solvent: ethanol Yield 15%, mp. 225–6°.

3-Ethyl-5-{bis[(1,3,3-trimethyl-2-indolinylidene)methyl]methylene}rhodanine.

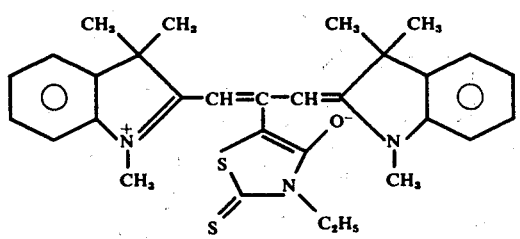

Recrystallization solvent: methanol Yield 34%, mp. 197–8°.

1,3-Diethyl-5-{bis[(1-methyl-2(3H)-quinolinylidene)methyl]methylene}-2-thiobarbituric acid.

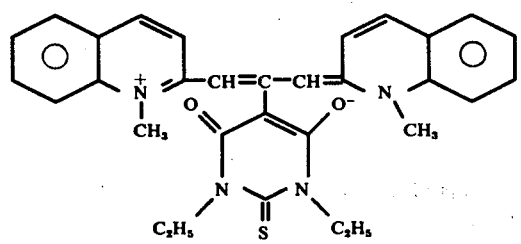

Purified by dissolving in methanol containing acetic acid, followed by precipitation by addition of excess triethylamine. Yield 46%, mp. 239–41°.

1,3-Diethyl-5{bis[(1-methyl-2(3H)-quinolinylidene)methyl]methylene}barbituric acid.

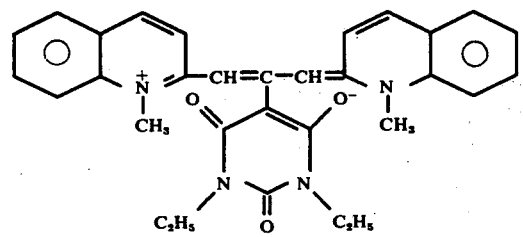

Purified by the method described in the previous example. Yield 28%, mp. 228–9°.

EXAMPLE 14

2-[(1-Ethyl-2(1H)quinolylidene)-2-bromo-1-hydroxyethylidene]indan-1,3-dione hydrotribromide

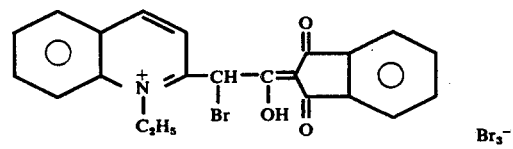

A suspension of 2-[(1-ethyl-2(1H)-quinolylidene)-1-hydroxyethylideme]inda-1,3-dione (1.72 g, 0.005 mol) in methylene chloride (25 ml) is stirred as bromine (1.76 g, 0.011 ml) in methylene chloride is added in one lot. The solid dissolves initially, and a new solid precipitates. After 5 minutes the product is collected and washed with methylene chloride. Yield 3.25 g (98%)

EXAMPLE 15

2-[(1-Ethyl-2(1H)-quinolylidene)vinylidene]-indan-1,3-dione

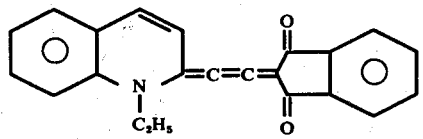

The product of Example 14 (1.33 g, 0.002 mol) and triethylamine (1.0 g, 0.01 mol) in dry acetonitrile (25 ml) is stirred as triphenylphosphine (1.15 g, 0.0044 mol) is added in one lot. After stirring for a further 5 minutes, the dye separates, is collected and washed with acetonitrile, to yield 0.34 g (53%) of crude dye, which is purified by recrystallization from acetonitrile, mp. indistinct.

EXAMPLE 16

The following dyes were prepared by procedures similar to that described in Example 15:

2-[(3-Ethyl-2-benzothiazolinylidene)vinylidene]indan-1,3-dione

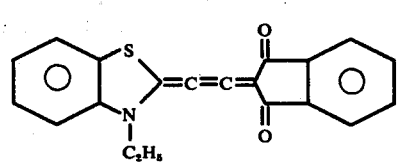

Yield 54% m, indistinct.

4-[(1-Ethyl-2(1H)-quinolylidene)vinylidene]-3-methyl-1-phenyl-2-pyrazolin-5-one

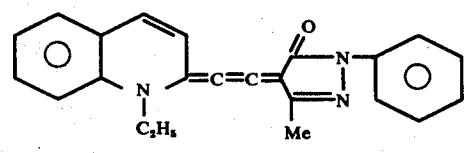

Yield 46%, mp. indistinct

4-[(3-Ethyl-2-benzothiazolinylidene)vinylidene]-3-methyl-1-phenyl-2-pyrazolin-5-one

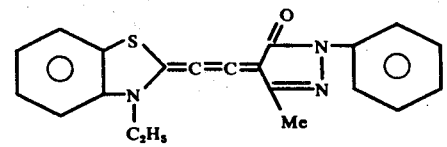

Yield 51%, mp. indistinct

2-[(1-Ethyl-2(1H)-quinolylidene)vinylidene]-
malononitrile

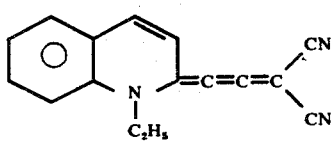

Yield 89%, mp. indistinct

2-[(3-Ethyl-2-benzothiazolinylidene)vinylidene]-
malononitrile

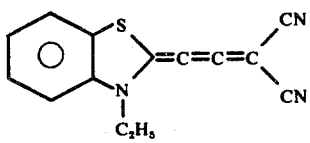

Yield 41%, mp. indistinct

The following example illustrates the preparation of a methyne dye with a five carbon atom chain.

EXAMPLE 17

2-[5-(1,3-Diethyl-1H-imidazo[4,5-b]quinoxalin-2-(3H)-ylidene)pent-1-en-3-ynyl]-3-methylbenzo-thiazolium perchlorate

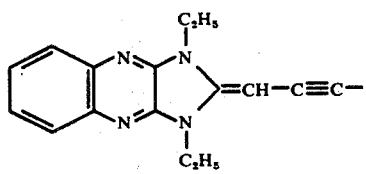

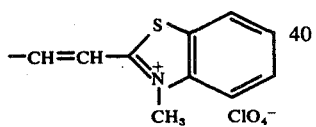

1,3-Diethyl-2,3-dihydro-(2-propyn-1-ylidene)-1H-imidazo[4,5-b]-quinoxaline (0.79 g, 0.003 mole) is suspended in dry acetonitrile (15 ml). Triethylamine (0.90 g, 0.009 mole) is added and with stirring 2-(2-benzoyloxy-1-ethen-1-yl)-3-methylbenzothiazolium chloride (freshly prepared) (1.04 g, 0.003 mole) is added over a period of about 2 minutes. Stirring is continued at room temperature for another 5 minutes, and the resulting dye is filtered off, washed with a very small amount of acetonitrile, then with benzene and finally with ether. Yield (as chloride salt) 0.38 g (27%).

The crude dye is dissolved in methanol (100 ml), filtered and sodium perchlorate (0.2 g) dissolved in water (1 ml) is added to the filtrate. The dye precipitated from solution immediately. It is filtered off, washed with water, methanol and ether successively. The sample is dried in vacuum at room temperature. Yield (as perchlorate salt) 0.32 g (20%), m.p. indistinct. m.w. 538. Elemental analysis and infrared spectrum support the assigned structure. λmax (acetonitrile) 606nm εmax = 8.8 × 10⁴.

The following example illustrates the preparation of the intermediate used in Example 17.

EXAMPLE 18

1,3-Diethyl-2,3-dihydro-(2-propynylidene)-1H-imidazo[4,5-b]quinoxaline

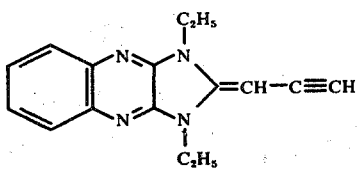

A mixture of 2-(2-Chloro-2-propenyl)-1,3-diethyl-1H-imidazo[4,5-b]quinoxalinium perchlorate 2.00 g (0.005 mole) and dry acetonitrile (20 ml) is stirred as triethylamine (1.50 g) is added in one portion to give a clear solution from which solid soon begins to separate. After 1 minute, the solid is collected, washed with several small portions of acetonitrile and dried in vacuum at room temperature. Yield 0.63 g (48%). m.w. 264. The elemental analysis, infrared and nuclear magnetic resonance spectral support the assigned structure.

The invention has been described in detail with particular reference to certain preferred embodiments thereof, but it will be understood that variations and modifications can be effected within the spirit and scope of the invention.

I claim:

1. A methyne dye having the following formula:

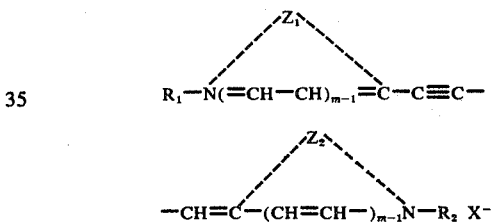

wherein $m$ is a positive integer of from 1 to 3; $R_1$ and $R_2$ each are independently selected from the group consisting of alkyl, lower alkoxyalkyl, hydroxyalkyl, phenylalkyl, carboxyalkyl, sulfoalkyl and sulfophenylalkyl, each containing 1 to 10 carbon atoms or from the group consisting of aryl, lower alkaryl, lower alkoxyaryl and chloroaryl, each containing 6 to 20 carbon atoms; $Z_1$ and $Z_2$ represent the non-metallic atoms required to complete a heterocyclic nucleus of the type used in cyanine dyes and $X^-$ is an acid anion.

2. A methyne dye having the following formula:

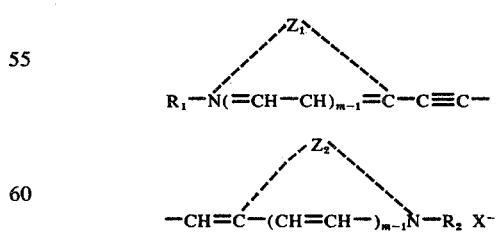

wherein $m$ is a positive integer of from 1 to 3; $R_1$ and $R_2$ each are independently selected from the group consisting of alkyl, lower alkoxyalkyl, hydroxyalkyl, phenylalkyl, carboxyalkyl, sulfoalkyl and sulfophenylalkyl, each containing 1 to 10 carbon atoms or from the group consisting of aryl, lower alkaryl, lower alkoxyaryl and chloroaryl, each containing 6 to 20 carbon atoms; $Z_1$ and $Z_2$ are each selected from the group consisting of a thiazole nucleus, an oxazole nucleus, a selenazole nucleus, a 3,3-dialkylindolenine nucleus and an imidazole nucleus, and $X^-$ is an acid anion.

3. A methyne dye having the formula:

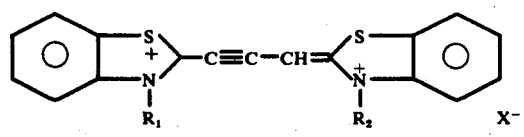

wherein $R_1$ and $R_2$ are each independently selected from the group consisting of alkyl, lower alkoxyalkyl, hydroxyalkyl, phenylalkyl, carboxyalkyl, sulfoalkyl and sulfophenylalkyl, each containing 1 to 10 carbon atoms or from the group consisting of aryl, lower alkaryl, lower alkoxyaryl and chloroaryl, each containing 6 to 20 carbon atoms and $X^-$ is an acid anion.

4. The methyne dye:

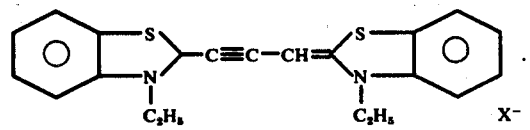

wherein $X^-$ is an acid anion.

5. A methyne dye having the following formula:

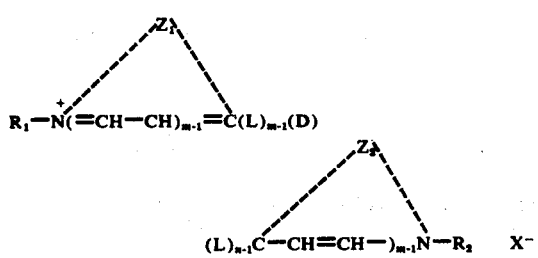

wherein D represents the resonance structure $(-C=C-) \leftrightarrow (=C=C=)$; L is a methine linkage; $m$ and $n$ each represent positive integers of from 1 to 3 provided that the total number of carbon atoms in the chain is an uneven number; $R_1$ and $R_2$ each are independently selected from the group consisting of alkyl, lower alkoxyalkyl, hydroxyalkyl, phenylalkyl, carboxyalkyl, sulfoalkyl and sulfophenylalkyl, each containing 1 to 10 carbon atoms or from the group consisting of aryl, lower alkaryl, lower alkoxyaryl and chloroaryl, each containing 6 to 20 carbon atoms; $Z_1$ and $Z_2$ each represent the non-metallic atoms required to complete a heterocyclic nucleus of the type used in cyanine dyes and $X^-$ is an acid anion.

6. A methyne dye having the following formula:

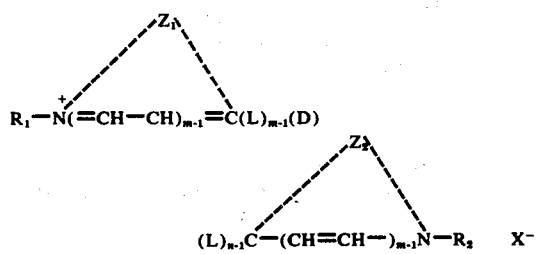

wherein D represents the resonance structure $(-C \equiv C-)(= C = C =)$; L is a methine linkage; $m$ and $n$ each represent positive integers of from 1 to 3 provided that the total number of carbon atoms in the chain is an uneven number; $R_1$ and $R_2$ each are independently selected from the group consisting of alkyl, lower alkoxyalkyl, hydroxyalkyl, phenylalkyl, carboxyalkyl, sulfoalkyl and sulfophenylalkyl, each containing 1 to 10 carbon atoms or from the group consisting of aryl, lower alkaryl, lower alkoxyaryl and chloroaryl, each containing 6 to 20 carbon atoms; $Z_1$ and $Z_2$, independently, complete a thiazole nucleus, an oxazole nucleus, a selenazole nucleus, a thiazole nucleus, a pyridine nucleus, a quinoline nucleus, a 3,3-dialkylindolenine nucleus or an imidazole nucleus and $X^-$ is an acid anion.

* * * * *